No. 679,212. Patented July 23, 1901.
A. VON BORRIES.
VALVE FOR COMPOUND ENGINES.
(Application filed Mar. 7, 1901.)
(No Model.) 2 Sheets—Sheet 1.

UNITED STATES PATENT OFFICE.

AUGUST VON BORRIES, OF HANOVER, GERMANY.

VALVE FOR COMPOUND ENGINES.

SPECIFICATION forming part of Letters Patent No. 679,212, dated July 23, 1901.

Application filed March 7, 1901. Serial No. 50,245. (No model.)

*To all whom it may concern:*

Be it known that I, AUGUST VON BORRIES, a subject of the King of Prussia, Emperor of Germany, residing at 26 Boedeckerstrasse, Hanover, Germany, have invented certain new and useful Improvements in Valves for use in Compound Locomotives and other Compound Engines, of which the following is a specification.

This invention has reference to improvements in that kind of valve apparatus for use in compound locomotives and other compound engines in which starting and intercepting valves are combined in such a way that the engine can be worked at will, either as a high-pressure engine or as a compound engine, as may be desired.

Now this invention has reference to an improved construction of valve apparatus of the kind referred to, whereby the starting-valve is adapted to also act as a reducing-valve, so that the pressure of the live steam then admitted to the low-pressure cylinder will be reduced proportionally to the increased area of the low-pressure piston, the construction, moreover, being such that whether the said combined valves be in the position adapted for simple or for compound working the direction of the steam-pressure thereon will be such as to assist in changing the combined valves by hand from either of the operative positions to the other.

Figure 1:
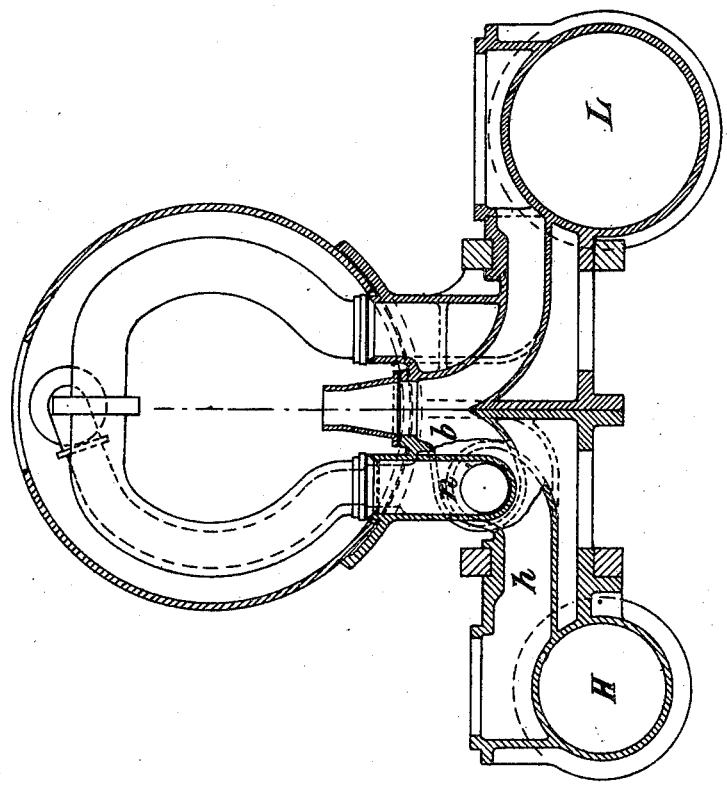
Figure 2:
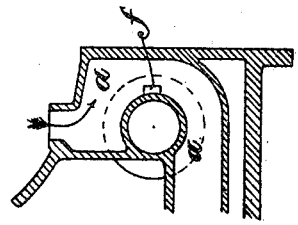
Figure 3:
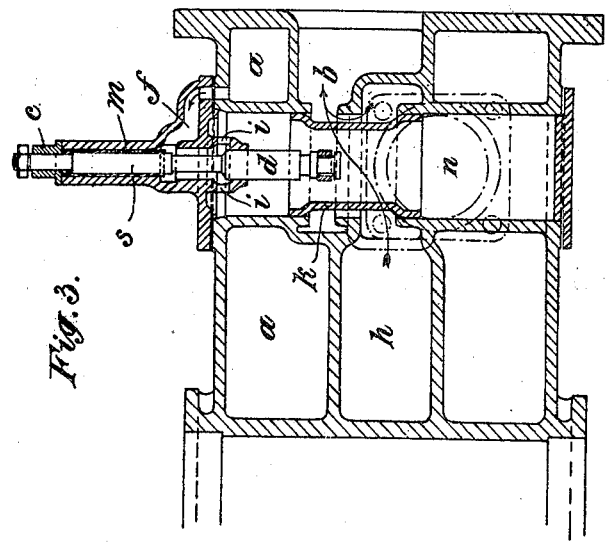

Figure 1 is a sectional view of a compound engine with my valve applied thereto. Fig. 2 is a sectional detail view of part of the valve. Fig. 3 is an elevation of the piston-valve and casing, partly in section; and Fig. 4 is a like view to Fig. 3, showing the hollow piston in another position.

Figure 4:
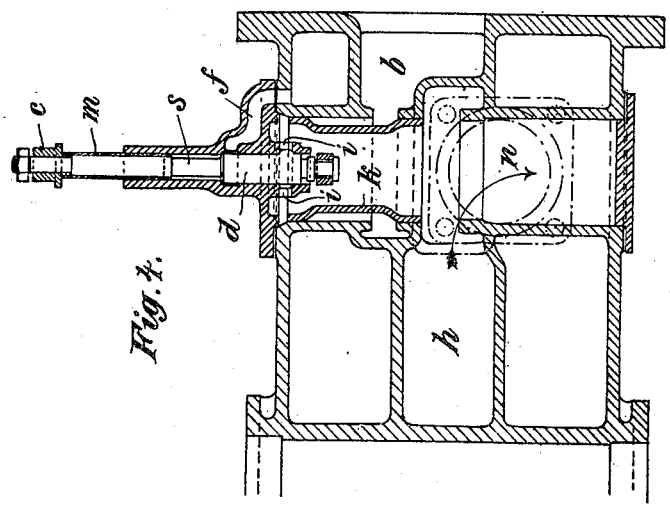

In one construction of valve apparatus according to this invention the intercepting-valve is in the form of a hollow piston-valve $k$, Figures 3 and 4, arranged to work within a suitable cylindrical casing, one end of which is closed by a cover and the other end of which forms a port $n$, which when the valve apparatus is in use communicates, usually through a steam-receiver, with the steam-chest of the low-pressure cylinder L. The cylindrical wall of the said casing is provided with a pair of ports that respectively communicate with the exhaust $h$ from the high-pressure cylinder H of the engine and with the main exhaust-pipe by $b$ and which are adapted to be placed in communication with each other in one position, Fig. 3, of the intercepting-valve $k$ by an annular passage formed in the outer periphery of that valve.

The cover which closes the end of the valve-casing is provided with a tubular extension that forms a casing for the valve-spindle $s$ and is provided at one side with an inlet-port $f$, through which live steam can be admitted from the main steam-pipe $a$ to the interior of the extension. The valve-spindle $s$ works through the said cover and extension and is so constructed and arranged that it serves not only as a starting-valve, but is also adapted to act after the manner of a reducing-valve to reduce the pressure of the live steam admitted to the low-pressure cylinder in proportion to the increased area of the piston upon which it is to act. The valve-spindle $s$ for this purpose comprises two coaxial and adjacent portions differing in diameter, the larger portion $d$, adjoining the intercepting-valve, being made of the same diameter as the corresponding portion of the tubular extension, to the inner end of which it works as a piston-valve to control the passage of live steam from the said inlet-port to the cylindrical valve-casing, the remaining portion $s$ of the valve-spindle of smaller diameter working through the opposite end of tubular extension. On the portion of the valve-spindle of smaller diameter is mounted a sleeve $m$, that is somewhat shorter than the reduced portion of the spindle and is capable of sliding easily thereon, its external diameter being equal to the bore of that portion of the tubular extension within which it works, but smaller than that of the larger part $d$ of the spindle. The combined starting, reducing, and intercepting valves may be moved by a hand-lever connected to a head $c$, that is adjustably secured to the valve-spindle, as by a nut and screw or the like, and against which the sleeve $m$ upon the valve-spindle $s$ is pressed by the action of live steam upon its annular inner end. The construction is such that when the combined valves are moved into one extreme position, Fig. 3, the ports in the valve-casing, which respectively communicate with the exhaust $h$ from the high-pressure cylinder and with the atmosphere by $b$, are connected by the annular passage in the outer periphery of the intercepting-valve $k$ and live steam will be admitted through the steam-inlet port $f$ in the tubular extension of the cover and allowed to flow between the bore of the said extension and the reduced portion of the valve-spindle and through ports $i$, that communicate with the inner face of the cover, and are then uncovered by the larger portion $d$ of the valve-spindle, the live steam thus admitted at a reduced pressure to the valve-casing passing through the hollow intercepting-valve and thence through the other end of the casing to the valve-chest of the low-pressure cylinder, the engine being then adapted to be worked as a simple or high-pressure engine. Any slight movements of the intercepting-valve produced when the valve-spindle is acting as a reducing-valve will be controlled by the weight and friction of the intercepting-valve $k$, which will prevent too sudden movement thereof. When the combined valves are moved into the opposite position, Fig. 4, the intercepting-valve $k$ will cover the port $b$ in the casing which communicates with the atmosphere and uncover the other port $h$, which admits of the passage of exhaust-steam from the high-pressure cylinder to the interior of the valve-casing $n$, and thence to the valve-chest of the low-pressure cylinder L, and the ports $i$, by which live steam was formerly admitted to the inner face of the cover through its tubular extension, will be covered by the larger portion $d$ of the valve-spindle. In this position of the valves the engine is adapted to be worked as a compound engine.

The diameters of the two coaxial portions $s\ d$ of the valve-spindle and of the sleeve $m$ upon the smaller portion $s$ are so proportioned that when the combined valves are in either position the resulting pressure of the steam thereon will assist in changing them to the alternative position. For this purpose the cross-sectional area of the smaller portion of the spindle $s$ may conveniently be made one-half and the annular cross-section of the sleeve $m$ thereon one-tenth of the cross-sectional area of the larger portion $d$ of the valve-spindle. Then when the engine is working as a simple or high-pressure engine, Fig. 3, and the spindle acting as a reducing-valve reduces the steam-pressure, say, to one-half that of the boiler-pressure, the pressure of live steam on the annular face between the two portions of the spindle will be just balanced by the action of the steam at reduced pressure on the other end thereof, and there will remain the pressure on the annular face of the sleeve $m$, which, acting through the head on the valve-spindle, will tend to move the combined valves into the position, Fig. 4, adapted for the compound working of the engine, and will consequently facilitate the movement of the said valves into that position by hand when desired. When, on the other hand, the engine is working as a compound engine, Fig. 4, the pressure within the valve-casing will be equal to that within the receiver for the high-pressure exhaust-steam—say about three-tenths that of the live steam. The live steam then admitted through the live-steam-inlet port $f$ into the tubular extension which surrounds the valve-spindle will act upon the annular faces of the larger portion $d$ of the spindle and of the sleeve $m$ and produce a resultant pressure, tending to move the combined valves into their alternative position, equal to four-tenths that exerted by live steam upon the cross-section of the larger portion of the spindle. This resultant pressure being opposed by the pressure of the steam within the casing, taken as equal to three-tenths that of the live steam, there remains a net resultant pressure equal to one-tenth that of the live steam upon the cross-section of the larger portion of the spindle, tending to move the combined valves into the position adapted for simple working of the engine and which will facilitate the movement of the said valves into that position by hand when desired.

Having thus described my invention, what I claim as new therein, and desire to secure by Letters Patent, is—

1. The combination of high and low pressure cylinders, a valve-casing having a port at one end communicating with the steam-chest of the low-pressure cylinder, the walls of said casing having two ports in different planes communicating respectively with the exhaust from the high-pressure cylinder and with the main exhaust, a hollow intercepting-valve movable in said casing and having an exterior annular passage between its ends, which, when the valve is in one extreme position establishes communication between the exhaust from the high-pressure cylinder and the main exhaust, and also between its interior and the port in the end of the casing, a reducing-valve movable with the hollow intercepting-valve and opening a port for admission of live steam to the interior of said hollow intercepting-valve when the latter is in said extreme position, said live steam passing from the intercepting-valve through the port in the end of the casing to the steam-chest of the low-pressure cylinder, substantially as set forth.

2. The combination of high and low pressure cylinders, a main exhaust-passage, a valve-casing, having ports communicating respectively with the high-pressure-cylinder exhaust, the steam-chest of the low-pressure cylinder, and the main exhaust, a hollow intercepting-valve in said casing movable to direct the exhaust from the high-pressure cylinder to either the main exhaust or the steam-chest of the low-pressure cylinder, a second valve-casing communicating with the first-named casing and with a live-steam-supply pipe, a piston-valve in the second casing connected to and movable with the intercepting-valve, said piston-valve controlling communication between the two casings, a tubular extension of the second casing of less diameter than the casing, a stem connected to the piston-valve and extending through said tubular extension, said stem being of less diameter than the piston-valve and also the tubular extension, a sleeve slidably mounted on the stem and in the tubular extension, and means connected to the stem to move the valves, substantially as and for the purpose specified.

In witness whereof I have hereunto signed my name in the presence of two subscribing witnesses.

AUGUST VON BORRIES.

Witnesses:
LEONORE KASCH,
C. C. STEVENSON.